May 29, 1934. E. O. BUEHLER 1,960,894
HAND OPERATED WEEDING AND CULTIVATING TOOL
Filed Sept. 14, 1933
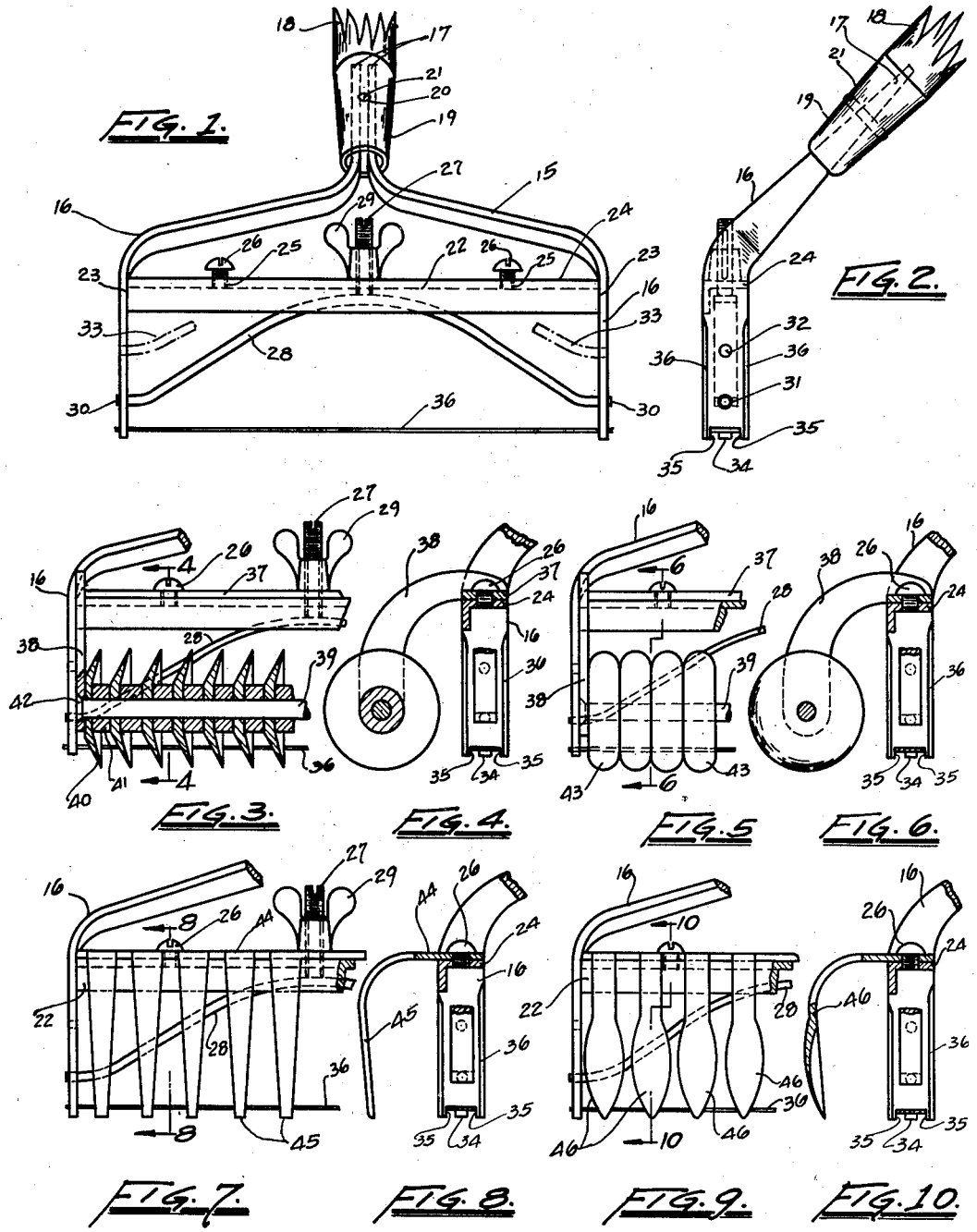
INVENTOR.
EMIL O. BUEHLER.
BY Edward M. Apple
ATTORNEY.

Patented May 29, 1934

1,960,894

UNITED STATES PATENT OFFICE 1,960,894

HAND OPERATED WEEDING AND CULTIVATING TOOL

Emil O. Buehler, Detroit, Mich.

Application September 14, 1933, Serial No. 689,447

7 Claims. (Cl. 97—58)

This invention relates to agricultural implements and particularly to hand operated garden tools.

The principal object of the invention is the provision of a combination, all-purpose garden tool, which is efficient in operation, readily adjustable, simple in design and construction, and economical to manufacture.

Another object of the invention is the provision of a tool with which the operations of weeding and cultivating may be performed simultaneously or independently, as preferred.

Another object of the invention is the provision of a tool which is very effective in destroying weeds by cutting them near the roots without particularly disturbing the upper surface of the ground.

Another object of the invention is the provision of a tool which may be effectively utilized to cut and destroy weeds on both the forward and backward movement of the tool.

Another object of the invention is the provision of a device for cutting and destroying weeds in which cast-off hack saw blades or corset stays may be effectively utilized as the cutting medium.

Another object of the invention is the provision of a device with which vertical and horizontal cultivation may be performed in one operation.

Another object of my invention is the provision of an agricultural tool having readily attachable and demountable accessories such as disc cultivator, roller, rake and spoon.

The foregoing and other objects and advantages of the invention will be more readily understood as the description proceeds, reference being had from time to time to the accompanying drawing in which:

Fig. 1 is a front elevation of the device embodying my invention.

Fig. 2 is a side elevation of the device embodying my invention.

Fig. 3 is a fragmentary plan view showing the disc cultivator unit attached.

Fig. 4 is a section taken along line 4—4 of Fig. 3.

Fig. 5 is a fragmentary plan view showing the roller unit affixed.

Fig. 6 is a sectional view taken on line 6—6 of Fig. 5.

Fig. 7 is a fragmentary plan view showing the rake element attached.

Fig. 8 is a sectional view taken on line 8—8 of Fig. 7.

Fig. 9 is a fragmentary plan view showing the spoon cultivator unit attached.

Fig. 10 is a sectional view taken on line 10—10 of Fig. 9.

Referring now more particularly to the drawing, numeral 15 designates the frame proper, which is constructed of two individual members 16, preferably made of cold rolled steel, having vertically disposed lower portions and inwardly and upwardly disposed shanks terminating through re-bends in reduced heads 17 adapted to be inserted into the end of a wooden handle 18 of any desired length. A reinforcing ferrule 19, adapted to fit about the end of the handle 18, is provided with a transverse opening 20 which permits the insertion of a tapered pin 21 adapted to pass between the reduced heads 17 of said frame, forcing them apart and preventing their removal from the end of the handle 18.

A cross member 22, preferably made of structural angle iron, is securely welded at each end to the frame members 16, as at 23. The horizontal leg 24 of said angle iron cross member 22 has two or more conveniently located tapped holes 25 adapted to receive mounting screws 26 to permit the attachment thereto of the various accessories hereafter described.

Positioned near the center of the horizontal leg 24 of the cross member 22 is another threaded hole 26 adapted to receive a slotted set-screw 27, which in turn is adapted to exert pressure on the spring member 28, which is interposed between the frame members 16 and curves upwardly to the underside of the horizontal leg 24 of the cross member 22. A wing nut 29 helps secure to the frame 15 the accessories hereinafter referred to, and acts as a lock nut for the set-screw 27.

Both ends of the spring member 28 are hollow-milled to form cylindrical studs 30, which are adapted to engage holes 31 formed near the lower ends of frame members 16. Another set of similar holes 32 are provided in the frame members 16 some distance above the holes 31 and are intended to accommodate a shorter but stiffer spring member as indicated by the numeral 33, if it is desired to permit the tool to be inserted into the ground to a greater depth.

At the extreme lower ends of the frame members 16 I hollow-mill the cylindrical studs 34 and the shoulders 35, said studs being adapted to engage holes formed near the ends of the cutting member 36, and said shoulders being adapted to serve as guards for the studs. The cutting member 36 should preferably be a thin narrow steel blade sharpened on both edges although I have had excellent results with the use of cast-off hack saw blades. It will be noted that the leading and trailing edges of the lower portions of frame members 16 are beveled, as indicated by 36, to produce a cutting edge.

The pressure produced on the spring member 28 by the set-screw 27, exerts itself toward the lower ends of the frame members 16 tending to force them outwardly, thereby producing sufficient tension on the cutting member 36 to keep it securely in place.

If it is desired to use any one of the accessories illustrated in Figs. 3, 5, 7, and 9, it is only necessary to remove the screws 26 and the wing nut 29, position the desired accessory on top of the horizontal leg 24 of the cross member 22 and replace said screws 26 and wing nut 29 and the device with its accessory is ready for use. The cutting member 36 may remain in position while the accessories are used, or it may be removed if so desired.

In Figs. 3 and 4 I illustrate the means of attaching a disc cultivator accessory to the frame 15. This accessory consists of a frame member having a horizontal body 37, having holes therethrough adapted to engage the screws 26 and setscrew 27, and angularly disposed legs 38 between which extends an axle 39 adapted to carry a multiplicity of disc cutters 40, and spacers 41. The axle 39 extends through holes formed near the ends of the legs 38 and is headed at each end as at 42 to insure permanency.

In Figs. 5 and 6, I illustrate a roller accessory which is identical in construction with the disc cultivator accessory disclosed in Figs. 3 and 4, except that in this accessory the rollers 43 are substituted for the discs 40 and spacers 41 of Figs. 3 and 4.

In Figs. 7 and 8 a rake attachment is illustrated. The rake 44 comprises a single stamping or forging having a multiplicity of angularly disposed teeth 45 formed intermediate its ends. This attachment is secured to the cross member 22 of the frame 15 in the same manner as the disc and roller units referred to above.

In Figs. 9 and 10, I illustrate a cultivating accessory which is formed and secured to the frame 15 in much the same manner as is the rake 44, shown in Figs. 7 and 8, except that in this unit spoons 46 are formed in place of the teeth 45 of Figs. 7 and 8.

To use the cutting unit as illustrated in Figs. 1 and 2, the operator simply places the open end of the frame 15 on the ground and moves it backward and forward. As the tool is moved the blade 36 is submerged in the ground to the approximate depth of the end 30 of the spring 28. If further depth is desired, a shorter spring 33 may be used. It is possible for the operator to use this weed cutter with a minimum of physical exertion. The disc cultivator roller and rake attachments may be used with equal effectiveness for their respective purposes.

Having described my invention, what I claim and desire to secure by Letters Patent is:

1. A tool of the character described comprising in combination a handle, a frame secured to said handle, said frame consisting of two diverging angularly disposed feet, a horizontal cutting element interposed between said feet, a cross member extending between said feet adapted to support a demountable cultivating element and a spring member interposed between said feet and contacting said cross member intermediate its ends.

2. A tool of the character described comprising in combination a handle, a frame secured to said handle, said frame consisting of two diverging angularly disposed feet, a horizontal cutting element interposed between said feet, a cross member extending between said feet adapted to support a demountable cultivating element, a spring member interposed between said feet and contacting said cross member intermediate its ends and means for exerting tension on said spring.

3. A tool of the character described comprising in combination a handle, a frame secured to said handle, said frame consisting of two diverging angularly disposed feet, a horizontal cutting element interposed between said feet, a cross member extending between said feet adapted to support a demountable cultivating element, and a spring member interposed between said feet and contacting said cross member intermediate its ends, said spring being adapted to spread said feet and exert force on said cutting element.

4. A tool of the character referred to comprising in combination a handle, a frame secured to said handle, said frame consisting of two diverging angularly disposed feet, means on the ends of said feet adapted to support a cutting element, a cross-member extending between said feet adapted to support a demountable cultivating element, and spring means interposed between said feet adapted to hold said feet normally in open relation.

5. A combination weed cutting and cultivating tool comprising a handle, a frame secured to said handle, said frame consisting of two diverging angularly disposed members, a cutting blade disposed between said members, spring means for maintaining tension on said cutting blade, and a cross member between said first named members adapted to carry a demountable cultivating element such as a rake, disc or similar element.

6. A combination weed cutting and cultivating tool comprising a handle, a frame secured to said handle, said frame consisting of two diverging angularly disposed members, a cross-member between said angularly disposed members adapted to support a demountable cultivating element, studs on the free ends of said angularly disposed members, a cutting blade having an opening near each end thereof adapted to engage said studs, and adjustable spring means adapted to spread the ends of said diverging angularly disposed members to create tension on said cutting blade to secure said blade against displacement.

7. An article of the character described comprising in combination, a handle, a frame secured to said handle, said frame consisting of two diverging angularly disposed members, a cross-member between said diverging angularly disposed members adapted to support a demountable cultivating element or elements, a cutting blade interposed between the ends of said diverging angularly disposed members, a spring interposed between said diverging angularly disposed members and contacting said cross-member, and a set-screw in threaded engagement with said cross-member adapted to exert force on said spring and aid in securing a demountable cultivating element or elements to said cross-member.

EMIL O. BUEHLER.